(12) United States Patent
Brown et al.

(10) Patent No.: US 7,175,869 B2
(45) Date of Patent: *Feb. 13, 2007

(54) METHOD OF DEFLAVORING SOY-DERIVED MATERIALS USING ELECTRODIALYSIS

(75) Inventors: Peter H. Brown, Glenview, IL (US); Colin P. Crowley, Wheeling, IL (US); Xiao-Qing Han, Naperville, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/941,578

(22) Filed: Sep. 15, 2004

(65) Prior Publication Data

US 2005/0031774 A1    Feb. 10, 2005

Related U.S. Application Data

(63) Continuation-in-part of application No. 10/655,259, filed on Sep. 4, 2003, now Pat. No. 7,045,163, and a continuation-in-part of application No. 09/939,500, filed on Aug. 23, 2001, now Pat. No. 6,787,173.

(60) Provisional application No. 60/250,228, filed on Nov. 30, 2000.

(51) Int. Cl.
*A23L 1/20*    (2006.01)

(52) U.S. Cl. ............... 426/422; 426/656; 426/634; 426/495

(58) Field of Classification Search ............... 426/656, 426/634, 422, 495
See application file for complete search history.

(56) References Cited

U.S. PATENT DOCUMENTS

| | | |
|---|---|---|
| 2,848,403 A | 8/1958 | Rosenberg |
| 3,995,071 A | 11/1976 | Goodnight, Jr. et al. |
| 4,072,670 A | 2/1978 | Goodnight, Jr. et al. |
| 4,091,120 A | 5/1978 | Goodnight, Jr. et al. |
| 4,420,425 A | 12/1983 | Lawhon |

(Continued)

FOREIGN PATENT DOCUMENTS

JP    60114392    6/1985

(Continued)

OTHER PUBLICATIONS

Quoc et al., Acceleratiiong of pH Variationg in Cloudy Apple Jusing Using Electrodialysis with Bipolar Membranes, *J. Agric. Food Chem*, 2000, 48, 2160-2166.

(Continued)

*Primary Examiner*—Anthony Weier
(74) *Attorney, Agent, or Firm*—Fitch, Even, Tabin & Flannery (57) ABSTRACT

Soy derived materials such as soy milk, soy flour, soy concentrates, and soy protein isolates, are deflavored by adjusting the pH of an aqueous composition of such soy derived materials using membrane electrodialysis to a pH of about 9 to about 12 to solubilize the soy proteins and to release the flavoring compounds and thereafter passing the pH-adjusted composition to an ultrafiltration membrane having a molecular weight cutoff up to about 50,000 Daltons under conditions at which the flavoring compounds pass through the membrane, leaving the retained soy material with improved flavor.

22 Claims, 9 Drawing Sheets

U.S. PATENT DOCUMENTS

| | | |
|---|---|---|
| 5,658,714 A | 8/1997 | Westfall et al. |
| 6,402,917 B1 | 6/2002 | Emery et al. |
| 6,461,491 B1 | 10/2002 | Hryn et al. |
| 6,482,305 B1 | 11/2002 | Mani |
| 6,537,436 B2 | 3/2003 | Schmidt et al. |
| 6,787,173 B2 * | 9/2004 | Akashe et al. ............... 426/422 |

FOREIGN PATENT DOCUMENTS

| | | | |
|---|---|---|---|
| JP | 4-278057 | * | 10/1992 |
| JP | 7042206 | | 2/1995 |
| JP | 9070581 | | 3/1997 |
| JP | 9164387 | | 6/1997 |

OTHER PUBLICATIONS

Hagg et al., Membranes in Chemical Processing, A Review of Applications and Novel Developments, *Separation and Purification Methods*, 1998, 27(1), 51-168.

* cited by examiner

\* = Significant at the 95% confidence level.
\*\* = Significant at the 85% confidence level.

Figure 9.

\* = Significant at the 95% confidence level
\*\* = Significant at the 85% confidence level

METHOD OF DEFLAVORING SOY-DERIVED MATERIALS USING ELECTRODIALYSIS

The present application is a continuation-in-part application of U.S. patent application Ser. No. 10/655,259, filed Sep. 4, 2003, now U.S. Pat. No. 7,045,163, and of U.S. patent application Ser. No. 09/939,500, filed Aug. 23, 2001, now U.S. Pat. No. 6,787,173, which was based on, and claimed benefit of, U.S. Provisional Application Ser. No. 60/250,228, filed on Nov. 30, 2000, and U.S. patent application Ser. No. 10/784,404, filed Feb. 23, 2004 and U.S. patent application Ser. No. 10/784,699 filed Feb. 23, 2004, all of which are hereby incorporated by reference.

BACKGROUND

This invention relates generally to the processing of soy-derived materials for use in various food products. More particularly, the invention relates to a method of deflavoring soy materials using membrane electrodialysis processing in combination with ultrafiltration to provide deflavored soy protein materials that are acceptable for use in a wide range of foods.

In recent years, soy proteins have become widely used in food products for the health benefits to be obtained from their use. In some applications, the taste of the soy materials is not objectionable. However, in some uses, such as dairy analog products, beverages and the like, the flavors found in soy materials may prevent their ready acceptance by the consumer. Thus, in order to extend the uses of soy materials, the present inventors wanted to find a method of reducing the flavor components of soy materials. However, it was not evident that methods which had been used previously to remove flavor components from other organic materials would be successful in the treating of soy materials. Organic materials, since they have complex compositions, must be tested to determine whether any given method of treating them will be satisfactory.

There are many articles and patents which relate to processing soy materials in order to recover the protein content and which at the same time reduce the flavor compounds to make the proteins more acceptable in food products. However, these previous disclosures were not specifically directed to removal of flavoring compounds and recovering as much of the protein as possible. One example is U.S. Pat. No. 4,420,425 in which protein components of soy are solubilized at a pH of 7 to 11, preferably about 8 and, after ultrafiltration through a membrane having a molecular weight cut off above 70,000, are recovered by spray drying the retained soy proteins. In variants, only a portion of the protein is solubilized at lower pH values and subjected to ultrafiltration with a membrane having a cutoff preferably above 100,000 molecular weight, the product was found to have improved color and flavor. A higher cutoff valve would be expected to result in a loss of valuable proteins. In another patent, U.S. Pat. No. 5,658,714, a soy flour slurry is pH-adjusted to the range of 7 to 10 to solubilize proteins, which are then passed through an ultrafiltration membrane and phytate and aluminum are retained, presumably as solids. While the molecular weight cutoff of the membrane was not given, it is assumed that the pore size was large in order to be able to pass the soluble proteins. Both of these patents contain extensive discussions of the efforts of others in the processing of soy materials; both require the use of base and/or acid to adjust pH; and neither teaches or suggests the control of pH during the ultrafiltration process.

In a group of related patents, Mead Johnson Company disclosed processes for solubilizing soy proteins by raising the pH of an aqueous solution of soy materials and recovering the proteins which are said to have a bland taste. The processes are principally directed to concentrating proteins rather than removing flavor compounds. In U.S. Pat. No. 3,995,071, the pH was increased to 10.1 to 14 (preferably 11 to 12) to solubilize soy proteins, after which the pH was lowered to about 6 to 10 and ultrafiltration with a membrane having a molecular weight cutoff of 10,000 to 50,000 Daltons was used to retain the proteins while discarding carbohydrates and minerals. In U.S. Pat. No. 4,072,670, emphasis was placed on removing phytates and phytic acid by solubilizing proteins at a pH of 10.6 to 14 and a temperature of 10 to 50° C. to make the phytates and phytic acid insoluble, then separating them and finally acidifying the solution to a pH of about 4 to 5 to precipitate the soy proteins. In U.S. Pat. No. 4,091,120 soy proteins were solubilized at a pH less than 10, preferably 7 to 9, and ultrafiltration was used to separate the proteins as retentate, while passing carbohydrates as permeate. These patents require the use of base and/or acid to adjust pH and do not teach or suggest control of the pH during the ultrafiltration process.

Electrodialysis apparatus are described in U.S. Pat. Nos. 6,537,436, 6,482,305 and 6,402,917. None of these patents describe the use of electrodialysis treatment in the processing of soy materials.

SUMMARY

The present invention is directed to a process to remove compounds in soy materials which contribute color and flavor and which interfere with the use of soy in certain food products such as beverages, dairy analogs, and the like. Soy-derived materials can be treated using the process of the invention to recover substantially all of the proteins and reject the compounds which cause undesirable color and flavor. The process of the invention utilizes membrane electrodialysis to raise and lower pH and does not require the addition of base and acid for pH adjustment. Hence, acids and bases are not added to the soy materials, undesirable precipitates and salts are not formed, and there is no need to remove precipitates or salts from the resulting products. Moreover, by controlling the pH within the range of about 9 to about 12 during the ultrafiltration process, deflavored soy materials having improved functional properties can be obtained. Thus, the product is suitable for many food products.

Broadly, the invention is a process for preparing an aqueous soy composition having a soy concentration of about 1 to about 20 percent, which is pH-adjusted using membrane electrodialysis to solubilize the protein content and to release the flavoring compounds. Then the composition is subjected to ultrafiltration, while maintaining pH control, using a membrane capable of retaining substantially all of the protein content of the soy while removing flavoring components as permeate. The pH of the resulting deflavored soy protein material may be adjusted using membrane electrodialysis. Alternatively, following the initial pH adjustment of the aqueous soy composition by electrodialysis, the composition is subjected to ultrafiltration, while allowing the pH to passively adjust with the diafiltration water.

The deflavored soy materials prepared by the present methods are ideally suited for use in dairy and non-dairy beverages, smoothies, health drinks, confectionary type products, nutritional bars, cheeses, cheese analogs, dairy and non-dairy yogurts, meat and meat analog products, cereals, baked products, snacks, and the like.

In one aspect, the invention is a method of deflavoring soy-derived materials such as soy milk, soy flour, soy concentrates, and soy protein isolates, which method includes preparing an aqueous composition of the soy material containing flavoring compounds, adjusting the pH to the range of about 8 to about 12, preferably about 9 to about 12, and more preferably about 9 to about 11 using membrane electrodialysis to solubilize the protein content of the soy material and release the flavor components, and then passing the pH-adjusted composition adjacent to the filtration membrane having pores which provide a molecular weight cutoff up to 50,000 Daltons. The pH may be maintained in the range of about 8 to about 12, or allowed to passively adjust lower toward the pH of the diafiltration water, thus retaining substantially all of the protein content, while passing through the pores the flavor producing compounds.

In another aspect, the invention includes adjusting the pH to the range of about 8 to about 12 using membrane electrodialysis to solubilize the protein content and releasing the flavor compounds, making it possible to separate such compounds by ultrafiltration. Membrane electrodialysis is conducted by contacting an aqueous composition of soy material with a bipolar selective membrane and a cationic monopolar membrane while applying an electrical field across the bipolar and monopolar membrane in an amount effective for providing an aqueous composition of soy material with a pH in the range of about 8 to about 12. Importantly, the pH is also controlled within the range of about 8 to about 12 during the subsequent ultrafiltration process, or the pH allowed to passively adjust with the added diafiltration water.

In one embodiment, the invention is a method for deflavoring soy materials in a continuous process wherein an aqueous mixture of soy materials which has been pH-adjusted using membrane electrodialysis is passed adjacent an ultrafiltration membrane to separate the flavor components. The pH is maintained at about 8 to about 12 during the ultrafiltration by using membrane electrodialysis or by the addition of the appropriate amount of an appropriate pH-altering material (generally a base). The permeate containing flavor components and water is passed adjacent a reverse osmosis membrane to dewater the permeate and the separated water is recycled to join recycled retentate and fresh pH-adjusted soy materials. A portion of the retentate is continually removed and the deflavored soy materials recovered. The pH of the deflavored soy material may be reduced to a pH less than about 8 by contacting the deflavored soy material with a bipolar membrane and anionic monopolar membrane while applying an electrical field across the bipolar and anionic membranes in an amount effective for providing a deflavored soy protein material with a pH of less than about 8.

In a preferred embodiment, the invention is a method for deflavoring soy materials in a batch or semi-continuous process wherein a pH-adjusted aqueous mixture of soy materials is passed adjacent an ultrafiltration membrane, the permeate is separated for recovery of the flavor components, and the retentate is recycled to join fresh pH-adjusted soy materials. Water is added. periodically or continuously to replace the water lost to the permeate and to adjust the concentration of soy materials in the combined stream to a predetermined level. If necessary, membrane electrodialysis can be used to adjust pH or a pH-altering material (e.g., a base) can be added to the recycled retentate or added water to control the pH to the desired range during the ultrafiltration process. The process is continued until all, or a significant portion, of the flavoring compounds have been removed.

In another preferred embodiment, the present invention provides a method for preparing deflavored soy protein material, said method comprising:

(a) preparing an aqueous composition of a soy material containing soy proteins, flavoring compounds, and insoluble materials;

(b) solubilizing the soy proteins by adjusting the aqueous composition of (a) with membrane electrodialysis to a pH in the range of about 9 to about 12 and releasing the flavoring compounds;

(c) removing the insoluble materials from the pH-adjusted aqueous composition of (b) to obtain a treated aqueous composition;

(d) passing the treated aqueous composition of (c) adjacent an ultrafiltration membrane having a molecular weight cutoff up to about 50,000 Daltons, while maintaining the pH in the range of about 9 to about 12, or allowing the pH to passively adjust lower than pH 9 toward with the diafiltration water, under suitable ultrafiltration conditions wherein the flavor compounds pass through the membrane, thereby deflavoring the soy material and retaining substantially all of the solubilized soy proteins;

(e) recovering the solubilized soy proteins retained by the ultrafiltration membrane to obtain the deflavored soy protein material; and (f) adjusting the pH of the deflavored soy protein material of (e) with electrodialysis to a pH of less than about 9 (if the pH is not passively adjusted as in (d)).

The ultrafiltration membrane used in the method of the invention will have a molecular weight cutoff up to 50,000 Daltons, preferably 1,000 to 50,000, most preferably about 10,000 and preferably is a polyethersulfone or ceramic membrane.

DETAILED DESCRIPTION

Figure 1:
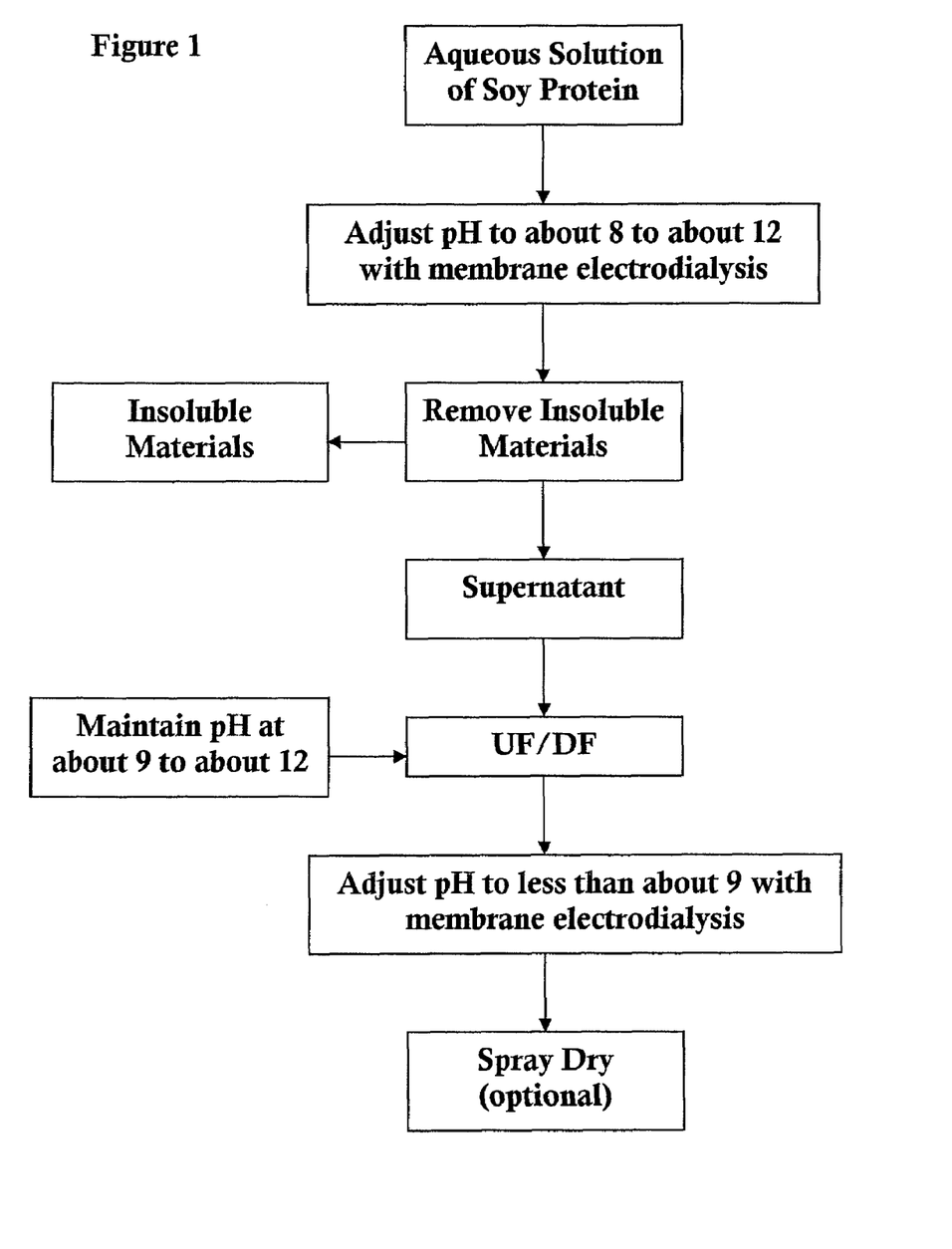
FIG. 1 is a block diagram of a preferred embodiment of the invention.

The process of the invention as generally described in FIG. 1 includes the following steps:

(1) prepare an aqueous mixture of the soy-derived material; (aqueous mixture may be filtered prior to step (2) to remove any particulates)

(2) Raise the pH of the aqueous mixture to about 9 to about 12 using membrane electodialysis in order to solubilize the soy proteins and to release the flavoring compounds;

(3) Pass the pH-adjusted mixture, while maintaining the pH in the range of about 9 to about 12, (alternatively, allow the pH to passively neutralize by mass action of the diafiltration water), adjacent to an ultrafiltration membrane having a molecular weight cutoff up to about 50,000 Daltons, remove the flavoring compounds as permeate, and remove the remaining soy proteins and other soy materials as retentate; and (4) Neutralize the retentate using membrane electrodialysis and recover the soy proteins.

Soy Derived Materials. All types of soy materials are considered to be potential sources of soy for use in food products. Thus, soy materials which contain proteins are combined into an aqueous mixture, generally a slurry of soy solids. The protein content is needed for food products, but is believed to contain flavoring compounds that must be released in order that they can be separated. The separation of flavoring compounds is carried out in an aqueous mixture in which both the proteins and flavoring compounds are dissolved. The concentration of the soy materials in the aqueous mixture will be in the range of about 1 to about 20 percent. Generally, the concentration of soy materials after pH adjustment will change during the subsequent ultrafiltration step as water is removed with the permeate. The water will be replaced either periodically or continuously. For example, in diafiltration, water is added to gradually dilute the retained proteins in a batch or semi-continuous process.

Membrane Electrodialysis to Adjust pH. The second step is important for removal of flavoring compounds. The soy proteins are solubilized by adjusting the pH of the aqueous mixture to achieve a pH of about 8 to about 12. In general, it has been found that a pH of about 9 is needed to solubilize all of the proteins, while a pH higher than about 12 is likely to cause undesirable degradation of the proteins. It is believed that solubilizing the soy proteins changes their shape and in some manner results in releasing the flavoring compounds, which may be bound or encapsulated by the soy proteins when they are in a neutral or acid solution. The flavoring compounds, which have relatively low molecular weight compared to the soy proteins are able to pass through the pores of the ultrafiltration membrane, while substantially all of the solubilized soy proteins are too large and are retained. Importantly, the pH should be maintained within the just described range (i.e., about 8 to about 12, more preferably about 9 to about 12) for a sufficient period of time during the ultrafiltration/diafiltration process to allow as much of the flavoring compounds as possible to be removed. (However, sufficient flavoring compounds may be removed by allowing the pH to passively neutralize during ultrafiltration as a consequence of pH dilution by the added diafiltration water).

Membrane electrodialysis is used to adjust the pH of aqueous soy materials. The use of membrane electrodialysis provides a method for adjusting pH without the addition of acid or base. As such, salts and precipitates that may form with the addition of acids and bases are not formed and their removal is not required.

Figure 2:
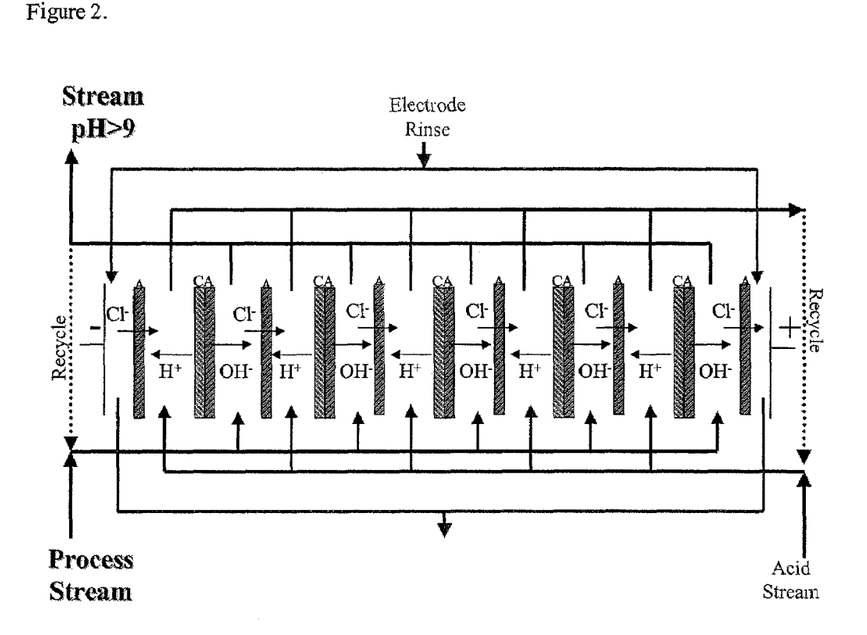
FIG. 2 is one example of a membrane electrodialysis system for increasing pH.
Figure 3:
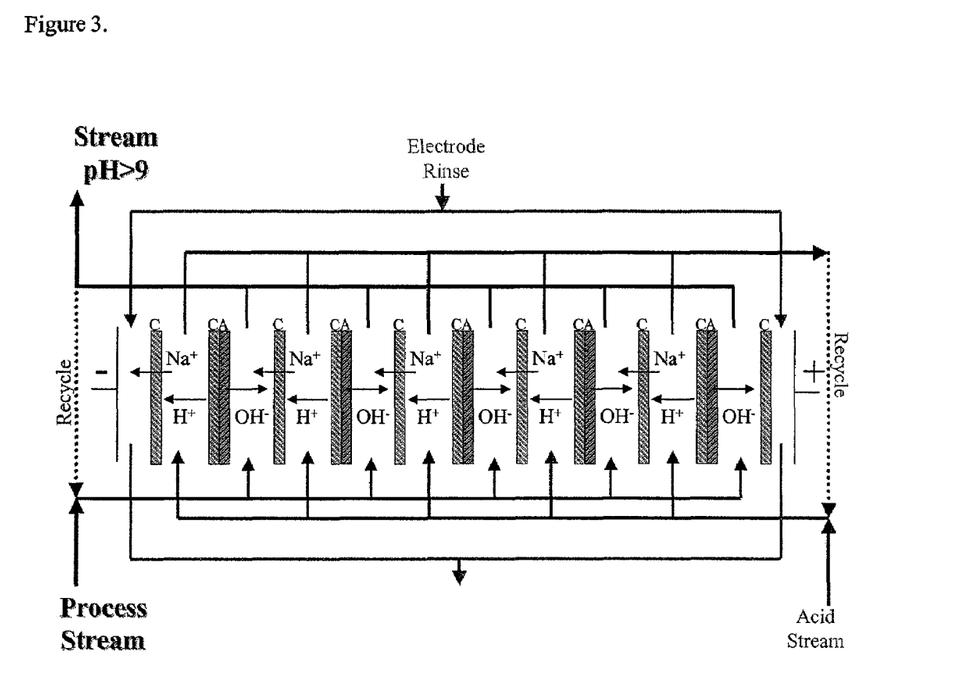
FIG. 3 is another example of a membrane electrodialysis system for increasing pH.

As shown in FIGS. 2 and 3, membrane electrodialysis may be conducted using a bipolar membrane and cationic membranes. The membranes are disposed between a cathode and anode and subjected to an electrical field. The membranes form separate compartments and materials flowing through those compartments may be collected separately. An example of an electrodialysis apparatus containing ion-selective membranes is EUR6 (available from Eurodia Industrie, Wissous, France). Suitable membranes are available from Tokuyama (Japan). A bipolar membrane includes a cationic membrane and an anionic membrane joined together.

In accordance with one aspect, an aqueous mixture of soy-derived material is contacted with the ion-selective membranes. Aqueous materials may be processed in a batch mode, semi-continuous mode, or continuously by flowing an aqueous solution over the ion-selective membranes. When using batch, semi-continuous mode, or continuous processing, an electrical potential is applied across the anode and cathode for a time effective for providing composition with the desired pH and ion concentrations. Processing times in a batch mode and flow rates in a semi-continuous mode or continuous mode are a function of the number of ion-selective membranes that are used and the amount of electrical potential applied, and the concentration and volume of the soy aqueous composition. Hence, the resulting composition can be monitored and further processed until a desired pH and ion concentration is achieved. Alternative membrane configurations are provided in FIGS. 2 and 3. Certain variations in membrane configuration are expected to achieve the same results.

As shown in FIGS. 2 and 3, the pH of the soy-derived materials may be adjusted to a pH range of about 8 to about 14 by contacting the aqueous solution with at least one, preferably a plurality of bipolar membranes that includes anionic or cationic membranes on both sides of the bipolar membrane. Materials from the compartments to the right of the bipolar membranes are collected for subsequent use. Materials collected from the compartments to the left of the bipolar membranes may be recirculated back through the membranes or circulated to a second membrane electrodialysis as many times as are needed to provide an aqueous solution having a pH of about 8 to about 14, preferably about 9 to about 12. Materials from the compartments to the right of the bipolar membranes may be recirculated back through the membranes. Materials from the compartments adjacent to the anode and cathode may be recirculated back through the membranes.

The pH-adjusted aqueous solution may be treated to remove insoluble materials. Any conventional technique (e.g., filtration, decantation, centrifugation, and the like) can be used. Alternatively, the aqueous solution prior to pH adjustment by electrodialysis may be treated to remove insoluble materials. Preferably, the insoluble material is removed by centrifugation. Commercial available continuous centrifligation units are ideally suited for this separation in a semi-batch or continuous type operation. In an especially preferred embodiment, the pH-adjusted aqueous is subjected to the removal technique (e.g., centrifugation) at least twice, before and after pH adjustment by membrane electrodialysis, in order facilitate or more complete removal of insoluble materials.

Ultrafiltration. In the present invention, ultrafiltration is used to remove flavoring compounds from soy-derived materials. Importantly, the pH of the soy-derived material should be maintained in the range of about 9 to about 12 during the ultrafiltration process. Ultrafiltration is intended to remove particles having a size between 10 to 1,000 Angstroms (0.001 to 0.1 μm), corresponding generally to particles having a molecular weight between 10,000 and 1,000,000, and that may also be affected by the shape of such high molecular weight particles. Soy proteins have molecular range between about 3,000 and 600,000. A membrane may be chosen which is capable of passing all of the soy proteins or only a selected portion. In the present invention, the soy proteins are retained by the ultrafiltration membrane under the selected operating conditions, while the lower molecular weight flavoring compounds pass through the membrane and are separated, thus improving the color and flavor of the retained soy proteins and associated solids.

A polymer ultrafiltration membrane may be defined as an anisotropic (non-uniform) layer. One face is a skin containing pores that determine the size of molecules that can pass through the membrane. Supporting the surface skin is a spongy structure that extends to the opposite face. Such membranes are commonly made by coagulation of polymers in an aqueous bath. Typical polymers that are used include polysulfones, cellulose esters, poly(vinyldenefluoride), poly (dimethylphenylene oxide), poly (acrylonitrile), which can be cast into membranes. Often, the membranes are formed into hollow tubes that are assembled into bundles, through which the solution to be filtered is passed. Alternatively, flat membrane sheets and spiral designs may be used. In commercial practice, pressure is applied to facilitate movement of the lower molecular weight compounds through the membrane. The membrane must be able to withstand the pressures used, making it important that the spongy supporting structure be uniform to avoid breaking the surface skin and bypassing the membrane.

In addition to the polymeric membranes just described, other materials have been used to make ultrafiltration membranes, such as ceramics, sintered metals, and other inorganic materials. The present invention is not limited to any particular type of membrane or size selected filtration, and may include but not limited to ultrafiltration, nanofiltration, microfiltration, reverse osmosis, and dialysis. In general, the membrane must be able to pass the flavoring compounds, which are believed to have molecular weights lower than 1,000 Dalton. More importantly, the membranes must be able to retain substantially all of the solubilized soy proteins. Thus, the membrane of the invention will have a molecular weight cutoff up to about 50,000 Daltons, preferably about 1,000 to 50,000 Daltons, more preferably 10,000 to 30,000 Daltons.

Ultrafiltration may be carried out in a batch manner similar to the laboratory experiments reported in the Examples below in which the flavor compounds and water passed through the membrane and were removed by flowing water. However, in commercial applications of the process of the invention, the pH-adjusted aqueous mixture would be circulated continuously adjacent to an ultrafiltration membrane. Since water, caustic hydroxyl ions, and the flavoring compounds pass through the membrane as permeate and are discarded, additional diafiltration water will be added to maintain the desired concentration of soy materials, which will tend to lower the pH of the aqueous mixture. This water may be augmented by dewatering the permeate and recycling the recovered water to the feed stream. The pH of the aqueous material may be maintained in the pH range of 9 to 12 by adjusting the pH of the aqueous material using membrane electrodialysis. Alternatively, a pH-modifying material (e.g., base) can be added as necessary to control the pH in the desired range (i.e., about 9 to about 12) directly to the ultrafiltration solution, to any recycled aqueous material, or to makeup water as desired.

Figure 4:
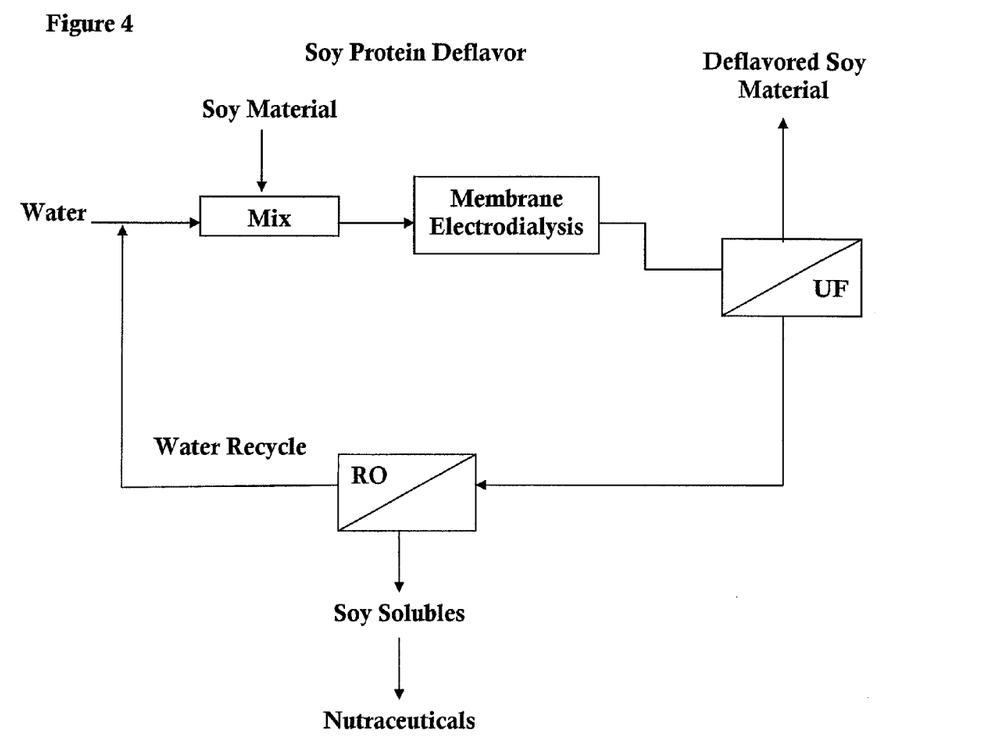
FIG. 4 is a block diagram of one process employing the invention.

A process for deflavoring soy materials by ultrafiltration may be operated in various ways. The pH during the ultrafiltration/diafiltration process is maintained in the range of about 8 to about 12, and preferably in the range of about 9.5 to about 10.5. Two methods will be described, continuous processing and batch (including semi-continuous operation) processing. It is expected that commercial processes will adopt batch or semi-continuous operation, which should be better suited to production of food-grade soy products. A continuous process is generally shown in FIG. 4. In either a continuous or batch process an aqueous mixture of soy materials is pH adjusted to solubilize soy proteins and release flavor compounds and then passed adjacent an ultrafiltration membrane that permits the lower molecular weight flavoring materials to pass through its pores along with water (the permeate), leaving the higher molecular weight soy materials (the retentate) to be recirculated. A portion of the retentate will be withdrawn as deflavored product, from which the soy materials can be recovered as needed for the ultimate end use. Water will be added to replace that lost in the permeate and to provide a constant concentration of soy materials in the feed stream supplied to the ultrafiltration membrane. Although not essential to the process, the process of FIG. 4 includes additional processing of the permeate to recover a portion of the water using a reverse osmosis membrane for recycling to join the retentate and fresh soy materials. The advantage of such a step is in reducing the amount of fresh water that must be added to the process and removed in concentrating the permeate. Of course, the pH of the soy-derived materials can be kept within the desired range by continuous electrodialysis, or appropriate addition of a base to the recycled or fresh water added to the process or by direct addition of base as desired.

In a batch process, such as those described in the Examples below, a batch of soy material is placed in a vessel, pH adjusted, and fed to an ultrafiltration membrane. The permeate is separated and the retentate is returned to the vessel. As the process proceeds, the soy material is depleted in the lower molecular weight flavoring compounds and water and becomes more concentrated in the desirable soy proteins. Periodically, diafiltration water is added to the retentate to dilute it and provide a carrier for the flavoring compounds that are passed through the membrane. In a semi-continuous process the diafiltration water is added continuously at the rate it is being removed in the permeate. The process is continued until all of the flavoring compounds have been removed and the retentate is sufficiently deflavored to become the product, which can be further processed as required for the ultimate end use. A batch or semi-continuous process may also include the concentration of the permeate, with recycle of separated water in a similar manner as that shown in FIG. 4. The pH during the ultrafiltration/diafiltration process is maintained in the range of about 8 to about 12, and preferably in the range of about 9.5 to about 10.5.

The ultrafiltration membrane will be operated with a pressure differential across the membrane that assists migration of the flavoring compounds, water and other materials that are capable of passing through the pores of the membrane, while not exceeding the physical strength of the membrane. Typical average pressure for such membranes are about 50 psi (345 kPa). The trans-membrane pressure (in versus out) will be about 15 psi (103 kPa). Of course, these pressures could be varied based on the membrane's specifications and other operational concerns. The flow rate of the feed stream will provide sufficient residence time for significant permeate removal, but also will be high enough to provide turbulence so that the access of the feed stream to the membrane pores will not be hindered by solid deposits on the membrane walls. One skilled in the art will understand that suitable operating parameters will be determined by the manufacturer's specification of the membrane used, and by experience with the materials being separated.

Figure 5:
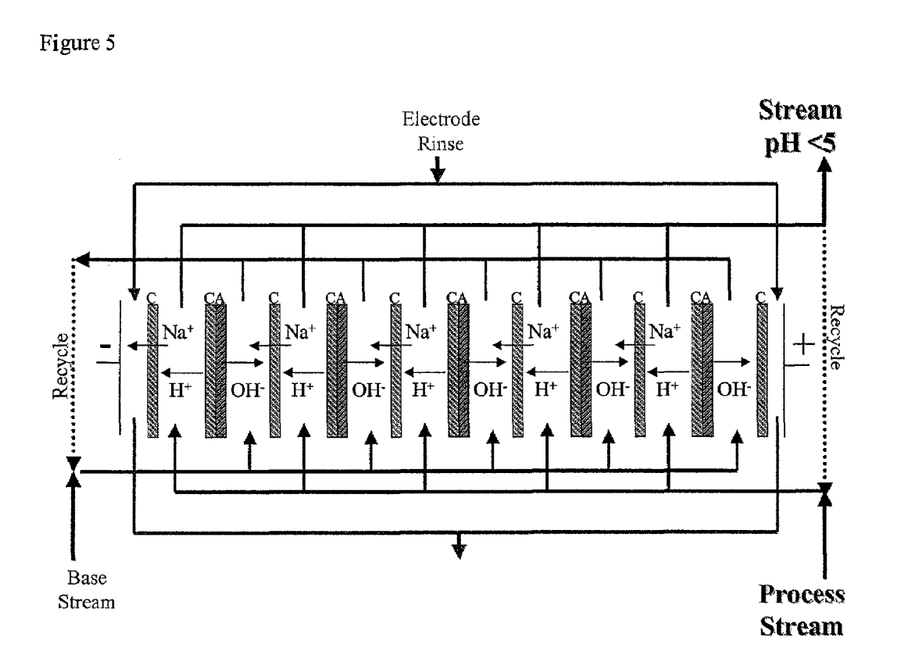
FIG. 5 is one example of a membrane electrodialysis system for decreasing pH.
Figure 6:
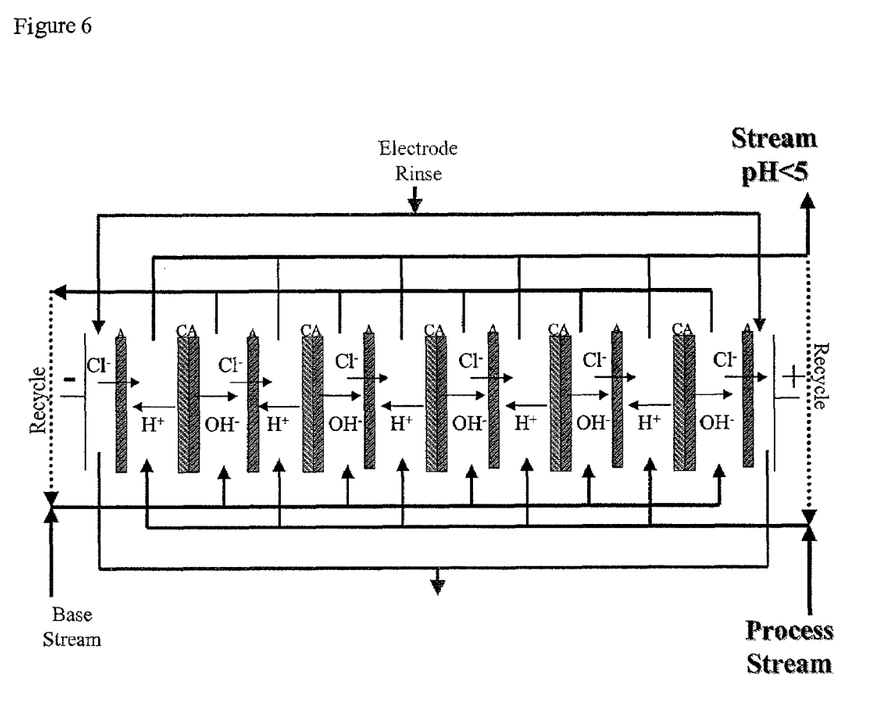
FIG. 6 is another example of a membrane electrodialysis system for decreasing pH.

Neutralize. After ultrafiltration, and as shown in FIGS. 5 and 6, the pH of soy protein materials is adjusted to a pH range of less than about 9, preferably about 6 to about 8, by contacting the soy material with at least one, preferably a plurality of bipolar membranes that includes cationic or anionic membranes on both sides of the bipolar membrane. Materials from the compartments to the left of the bipolar membranes are collected for subsequent use. Materials collected from the compartments to the right of the bipolar membranes may be recirculated back through the membranes or circulated to a second membrane electrodialysis as many times as needed. Aqueous soy-materials from the compartments to the left of the bipolar membranes may also be recirculated back through the membranes to neutralize the aqueous soy-solution to a pH of less than about 9, preferably 6 to about 8. Materials from the compartments adjacent to the anode and cathode may be recirculated back through the membranes.

Deflavored Soy Protein Products. The deflavored soy materials prepared by the present methods are ideally suited for use in dairy and non-dairy beverages, smoothies, health drinks, cheeses, cheese analogs, dairy and non-dairy yogurts, meat and meat analog products, cereals, baked products, snacks, and the like. The deflavored soy protein solution may be used directly or it may be converted to a solid form if desired. Any conventional technique for removing water can be used. Generally, spray or freeze-drying techniques are preferred.

For example, the deflavored soy protein material of this invention may be incorporated into food products as described in following copending applications (all of which are incorporated by reference). The present application is a continuation-in-part application of U.S. patent application Ser. No. 10/655,259, filed Sep. 4, 2003, and of U.S. patent application Ser. No. 09/939,500, filed Aug. 23, 2001, which was based on, and claimed benefit of, U.S. Provisional Application Ser. No. 60/250,228, filed on Nov. 30, 2000, and U.S. patent application Ser. No. 10/784,404, filed Feb. 23, 2004 and U.S. patent application Ser. No. 10/784,699 filed Feb. 23, 2004, all of which are hereby incorporated by reference The following examples illustrate methods for carrying out the invention and should be understood to be illustrative of, but not limiting upon, the scope of the invention that is defined in the appended claims.

Unless noted otherwise, all percentages are by weight.

EXAMPLE 1

Soy protein isolate (Supro 710 from DuPont Protein Technologies, St. Louis, Mo.; 93 percent protein on a dry basis) was hydrated in tap water to provide a concentration of 5 percent. The pH was adjusted to about 10.2 using membrane electrodialysis with a anion monopolar-bipolar-anion monopolar membrane stack configuration as described in FIG. 2. Anion membranes (AHA) and bipolar membranes (BP-2) were from Takuyama. The acid stream consisted of 3 liters of 0.1 M NaCl, the electrode rinse consisted of 3 liters of 0.5M sodium sulfate. The soy protein process stream was 5% soy protein isolate (Supro 710 (DuPont Protein Technologies) having an initial pH of about 7.0. Electrodialysis-alkalinization of the process stream proceeded for about 4 hours at about 61 volts, until the pH was about 10.3. This resulted in a net energy transfer of about 3400 joules. The alkalinized soy solution was transferred to dialysis tubing (Spectrum Inc.) having a 3500 molecular weight cutoff, to effect ultrafiltration. The alkalinized soy solution sample was dialyzed at 2° C. against five changes of 4.5 gallons of water over four days. During dialysis, the pH of the alkalinized soy solution passively decreased to about pH 7.0. The composition remaining in the dialysis tubing was transferred to a lyophilization flask, frozen to −50° C., and was freeze-dried at −50° C. under a vacuum of about 50 microns of mercury. The freeze-dried powder was evaluated for aroma and taste.

Figure 7:
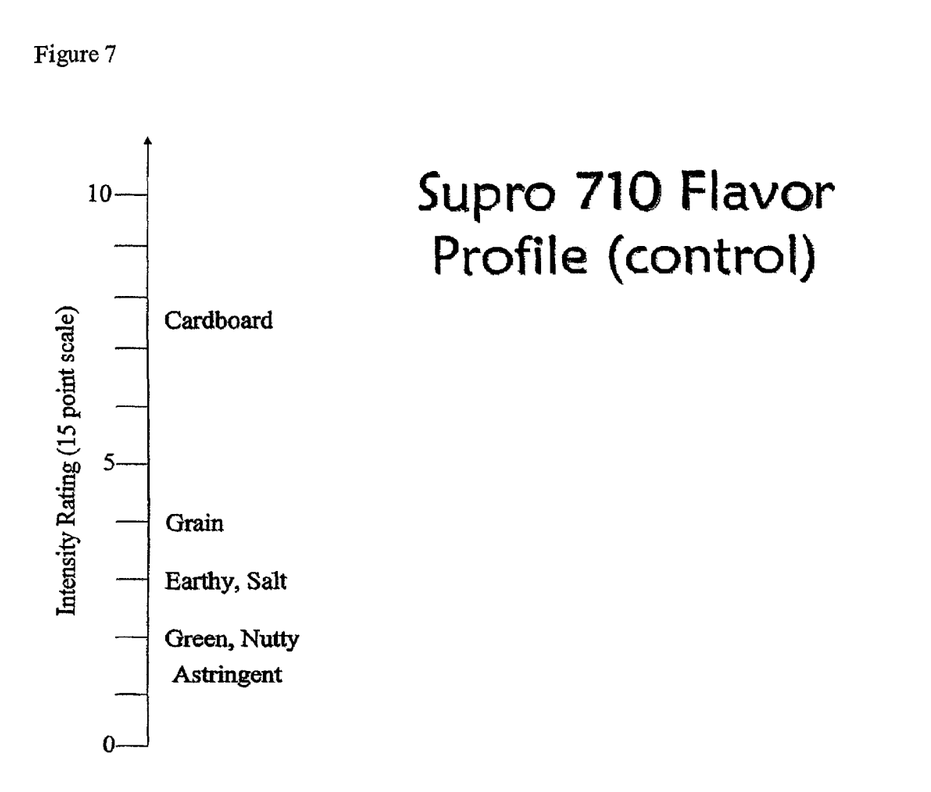
FIG. 7 is a graph of the intensity of flavor attributes in soy protein isolate (Supro 710) material that has not been deflavored.

Characterization of the control protein (Supro 710) solution flavor profile is shown in FIG. 7, and results presented on a 0–15 intensity scale. The control protein solution is characterized by strong cardboard flavor attribute. Sensory evaluations were made with the treated composition in the above example, and a control sample that was subjected to ultrafiltration similarly to the treated sample (dialyzed control). A trained sensory panel evaluated samples using descriptive analysis, and panelists were presented samples in a blind and randomized order as 5% (w/w) protein solutions in water. Results are presented as a difference relative to the control on a −5 to +5 magnitude of difference scale. Statistical analysis allowed for comparison of the control, dialyzed control, and treated sample across attributes. Statistical differences are shown at the 95% confidence level unless otherwise noted.

The table below shows a sensory test comparison of the control (Supro 710), dialyzed control, and soy protein sample treated as described in Example 1. When compared to the control, the treated soy solution was weaker in multiple attributes, being significantly less intense in the cardboard attribute, and directionally (85% confidence level) less intense in the green and earthy attributes. However, the treated sample was more intense in the astringent and grain attributes. It is clear from the results that the treated soy protein solution had been rendered more neutral in flavor by removal of flavor components. Ultrafiltration of the control soy (dialyzed control) did not decreased the intensity of the green or earthy attributes, and did not reduce the cardboard flavor to the same degree as treating the soy protein as described above in Example 1. This clearly indicates that electrodialysis treatment renders the soy solution more neutral in flavor by removal of flavor compounds than ultrafiltration alone.

TABLE 1

Control Flavor Attributes and the Affects of Ultrafication or Electrodialysis and Ultrafiltration on Flavor Attributer Intensity

| Attribute | Control[1] | Dialyzed Control[2] | Electrodialysis & Ultrafiltration[2] |
|---|---|---|---|
| Green | 2.2 | 0 | −0.4** |
| Cardboard | 7.6 | −0.6* | −2.4* |
| Grain | 4.2 | 0 | 0.8** |
| Nutty | 2 | 0 | 0 |
| Earthy | 3 | 0.4 | −0.4** |
| Oxidized | 0 | 0 | 0 |
| Sweet | 0.3 | 0.2 | 0.2 |
| Sour | 0 | 0.2 | 0.2 |

TABLE 1-continued

Control Flavor Attributes and the Affects of Ultrafication or
Electrodialysis and Ultrafiltration on Flavor Attributer Intensity

| Attribute | Control[1] | Dialyzed Control[2] | Electrodialysis & Ultrafiltration[2] |
|---|---|---|---|
| Salt | 2.9 | 0.6 | 0.4 |
| Bitter | 0.65 | 0.8 | 0.6 |
| Astringent | 1.4 | 1.6* | 1.7* |

[1]Control values are based on an absolute 0–15 point scale.
[2]Values are differences relative to control values on a −5 to +5 magnitude of difference scale.
*Significance at the 95% confidence level.
**Significance at the 85% confidence level

EXAMPLE 2

Soy protein isolate, Supro 675 (DuPont Protein Technologies, St. Louis, Mo.), 92.5% protein on a dry basis, was mixed with water to make 8 liters of about 16% soy protein solution (soy solution 1) and 8 liters of about 19% soy protein solution (soy solution 2). The samples were subjected to bipolar membrane electrodialysis using a cation monopolar-bipolar-cation monopolar membrane stack configuration as described in FIG. 3. Cation membranes (CMB) and bipolar membranes (BP-1) were from Tokuyama. The acid stream consisted of 8 liters of 0.1 M NaCl, 0.1 M NaH$_2$PO$_4$. The electrode rinse stream was 6 liters of 0.5M Na$_2$SO, 0.2M Na$_2$HPO$_4$. Electrodialysis-alkalinization of soy solution 1, with an initial pH of about 7.3, proceeded for about 15 minutes at between 31–60 volts for about 15 minutes, until the pH of the process stream was about 10.1. The net energy transfer was about 5050 joules. Electrodialysis-alkalinization of soy solution 2, having an initial pH of about 7.3, proceeded at about 45 volts for about 45 minutes, until the pH of the process stream was about 10.2. The net energy transfer was about 7200 joules. Alkalinized soy solution 1 and 2 were cooled to about 4 degrees C and combined, the resulting mixture having a pH about 10.3. The alkalinized soy solution mixture was subjected to ultrafiltration (UFP-30-C-55 membrane, A/G Technologies) having a 30,000 nominal molecular weight cutoff. Water permeate in which off flavors and color were dissolved was removed from the alkalinized soy solution mixture rententate. For approximately every 16 pounds of permeate lost, 16 pounds of fresh dialfiltration water was added to dilute the concentrated retentate. This was repeated 43 times, allowing the pH to passively drop from about pH 10.3 to about pH 7.5. The ultrafiltered protein solution was collected, freeze-dried, and sensory evaluation performed.

Sensory evaluations were made with the treated compositions in the above example. A trained sensory panel evaluated samples using descriptive analysis, and panelists were presented samples in a blind and randomized order as 5% (w/w) protein solutions in water. Results were presented as Mean Intensity Ratings of the Attributes. Statistical analysis allowed for comparison of the control and treated samples across attributes. Statistical differences are shown at the 95% confidence level unless otherwise noted.

Figure 8:
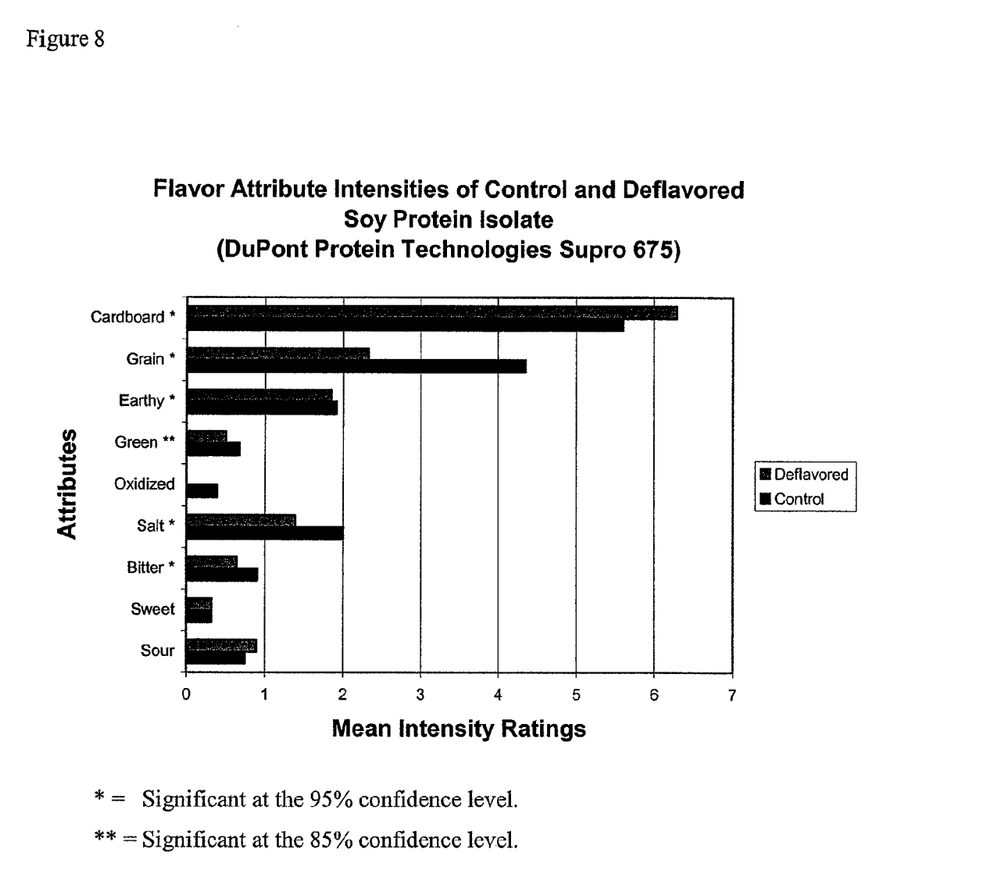
FIG. 8 is a graph of the flavor attribute intensities of a deflavored soy protein (Supro 675) material using bipolar membrane electrodialysis in combination with ultrafiltration as compared to the control soy protein material.

FIG. 8 shows a sensory test comparison of the control (Supro 675) and soy protein sample treated as described in Example 2. When compared to the control, the treated soy solution was weaker in multiple attributes, being significantly less intense in the grain, earthy, salt, and bitter attributes, and directionally (85% confidence level) less intense in the green attribute. However, the treated sample was more intense in the cardboard attribute. It is clear from the results that the treated soy protein solution had been rendered more neutral in flavor by removal of flavor components.

EXAMPLE 3

Soy protein isolate, PRO-FAM 825 isolate soy protein (Archer Daniels Midland Company, Decatur, Ill.), 90% protein on a dry basis, was mixed with water to make 8 liters of about 10% soy protein solution. The soy solution, having a pH=7.2, was subjected to bipolar membrane electrodialysis using a cation monopolar-bipolar-cation monopolar membrane stack configuration as described in FIG. 3. Cation membranes (CMB) and bipolar membranes (BP-1) were from Tokuyama. The acid stream consisted of 8 liters of 0.1 M NaCl, 0.2 M NaH$_2$PO$_4$. The electrode rinse stream was 8 liters of 0.5M Na$_2$SO, 0.2M Na$_2$HPO$_4$. Electrodialysis-alkalinization of the soy solution proceeded for about 40 minutes, at 50 volts, until the pH of the process stream was about 10.3. Net energy transfer was about 4711 joules. The alkalinized soy solution mixture was diluted 1:1 with cold water, and subjected to ultrafiltration (UFP-30-C-55 membrane, A/G Technologies, 30,000 nominal molecular weight cutoff). Water permeate in which off flavors and color were dissolved was removed from the alkalinized soy solution mixture rententate. Each time one half the weight of the soy protein solution was removed as permeate, an equal amount of cold water was added to dilute the retentate. This was repeated six times during ultrafiltration. The temperature of the soy solution retentate was maintained at about 16° C. During ultrafiltration, the pH dropped from an initial pH=10.1, to a final pH=9.2. The ultrafiltered soy protein solution retentate was collected, and subjected to bipolar membrane electrodialysis using a cation monopolar-bipolar-cation monopolar membrane stack configuration as described in FIG. 5. The base stream consisted of the former acid stream, i.e., 8 liters of 0.1 M NaCl, 0.2 M NaH$_2$PO$_4$. The electrode rinse stream was 8 liters of 0.5M Na$_2$SO, 0.2M Na$_2$HPO$_4$. Electrodialysis-acidification of the soy solution proceeded for about 45 minutes, at 50 volts, until the pH of the process stream was about 7.6. Net energy transfer was about 1051 joules. The process stream was collected, freeze-dried, and sensory evaluation performed.

Sensory evaluations were made with the treated compositions in the example 3. A trained sensory panel evaluated samples using descriptive analysis, and panelists were presented samples in a blind and randomized order as 5% (w/w) protein solutions in water. Samples were statistically analyzed using ANOVA, which compared control and deflavored soy samples for each sensory attribute. Statistical differences are shown at the 95% confidence level unless otherwise noted.

Figure 9:
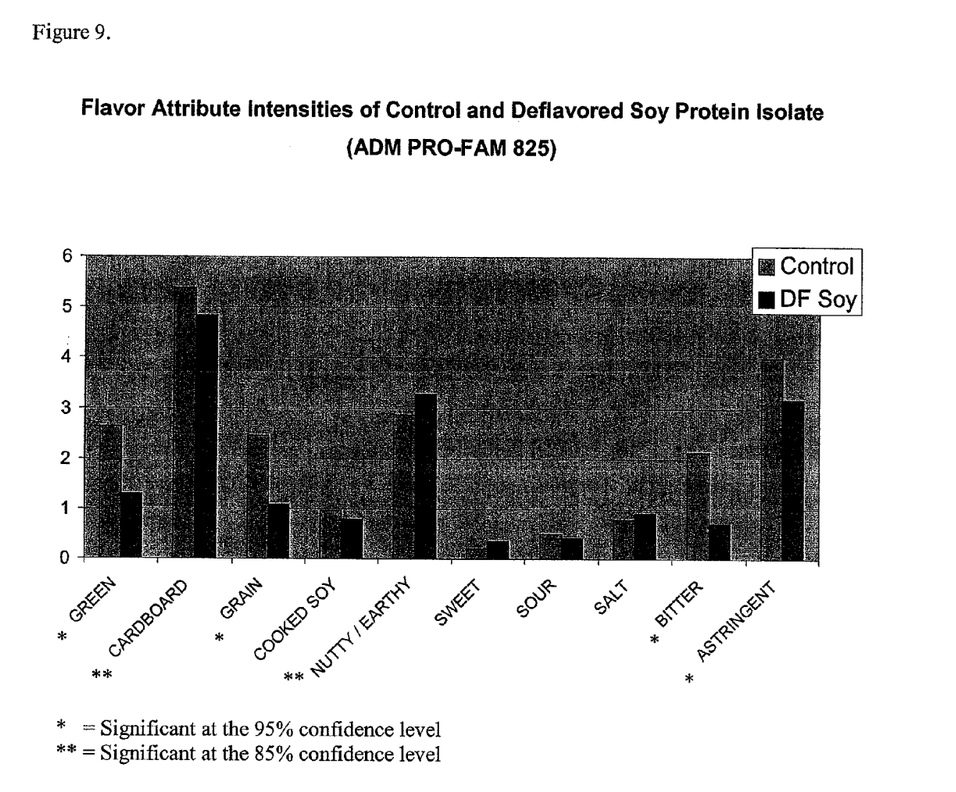
FIG. 9 is a graph comparing the flavor attribute intensities of deflavored soy protein (PRO-FAM 825) material using serial bipolar membrane electrodialysis alkalinization—ultrafiltration—bipolar membrane electroidialysis acidification, as compared to the control soy protein material.

The control PRO-FAM 825 soy sample had high green, cardboard, grainy, nutty/earthy, bitter, and astringent flavors (FIG. 9). The deflavored soy sample was less intense in all sensory attributes, except for nutty/earthy. The increase in nutty/earthy flavor was likely due to the absence of the other flavors attributes. The deflavored soy sample was less intense in overall flavor compared to the control soy sample.

What is claimed is:
1. A method for preparing deflavored soy protein material, said method comprising:
   (a) preparing an aqueous composition of a soy material containing soy proteins, flavoring compounds, and insoluble materials;

(b) solubilizing the soy proteins by adjusting the aqueous composition of (a) with electrodialysis to a pH in the range of about 9 to about 12 and releasing the flavoring compounds;

(c) removing the insoluble materials from the pH-adjusted aqueous composition of (b) to obtain a treated aqueous composition;

(d) passing the treated aqueous composition of (c) adjacent an ultrafiltration membrane having a molecular weight cutoff up to about 50,000 Daltons, while maintaining the pH in the range of about 9 to about 12, under suitable ultrafiltration conditions wherein the flavor compounds pass through the membrane, thereby deflavoring the soy material and retaining substantially all of the solubilized soy proteins;

(e) recovering the solubilized soy proteins retained by the ultrafiltration membrane to obtain the deflavored soy protein material; and (f) adjusting the pH of the deflavored soy protein material of (e) with electrodialysis to a pH of less than about 9.

2. The method of claim 1, wherein the soy material is at least one member of the group consisting of soy milk, soy protein isolate, soy concentrate, and soy flour.

3. The method of claim 1, wherein the soy material is soy flour.

4. The method of claim 3, wherein the soy flour is defatted soy flour.

5. The method of claim 2, wherein the insoluble materials are removed from the pH-adjusted aqueous composition using at least one centrifugation step.

6. The method of claim 4, wherein the insoluble materials are removed from the pH-adjusted aqueous composition using at least one centrifugation step.

7. The method of claim 5, wherein the aqueous composition of (a) has a concentration of soy material in the range of about 1 to about 20 percent.

8. The method of claim 6, wherein the aqueous composition of (a) has a concentration of soy material in the range of about 1 to about 20 percent.

9. The method of claim 5, wherein the ultrafiltration membrane has a cutoff in the range of about 1,000 to about 50,000 Daltons.

10. The method of claim 6, wherein the ultrafiltration membrane has a cutoff in the range of about 1,000 to about 50,000 Daltons.

11. The method of claim 9, wherein the ultrafiltration membrane has a cutoff in the range of about 10,000 to about 30,000 Daltons.

12. The method of claim 10, wherein the ultrafiltration membrane has a cutoff in the range of about 10,000 to about 30,000 Daltons.

13. The method of claim 11, wherein the ultrafiltration is carried out at a temperature in the range of about 2 to about 60.degree. C. and a suitable pressure.

14. The method of claim 12, wherein the ultrafiltration is carried out at a temperature in the range of about 2 to about 60.degree. C. and a suitable pressure.

15. The method of claim 13, wherein the ultrafiltration membrane is a a polymer, ceramic, or inorganic membrane.

16. The method of claim 14, wherein the ultrafiltration membrane is a a polymer, ceramic, or inorganic membrane.

17. The method of claim 1, wherein the deflavored soy protein material is further treated to remove water to obtain a solid deflavored soy protein material.

18. The method of claim 5, wherein the deflavored soy protein material is further treated to remove water to obtain the deflavored soy protein material in a solid form.

19. The method of claim 6, wherein the deflavored soy protein material is further treated to remove water to obtain the deflavored soy protein material in a solid form.

20. The method of claim 1, wherein the deflavored soy protein material is spray dried to remove water to obtain the deflavored soy protein material in a solid form.

21. The method of claim 5, wherein the deflavored soy protein material is spray dried to remove water to obtain the deflavored soy protein material in a solid form.

22. The method of claim 6, wherein the deflavored soy protein material is spray dried to remove water to obtain the deflavored soy protein material in a solid form.

* * * * *

UNITED STATES PATENT AND TRADEMARK OFFICE
CERTIFICATE OF CORRECTION

PATENT NO. : 7,175,869 B2 Page 1 of 1
APPLICATION NO. : 10/941578
DATED : February 13, 2007
INVENTOR(S) : Brown et al.

It is certified that error appears in the above-identified patent and that said Letters Patent is hereby corrected as shown below:

On the title page, col. 2 (Other Publications), line 1, delete "Accelerationg" and insert -- Acceleration -- .

On the title page, col. 2 (Other Publications), line 1, delete "Variationg" and insert -- Variation -- .

On first page, col. 2 (Other Publications), line 1, delete "Jusing" and insert -- Juice -- .

Signed and Sealed this

Twenty-second Day of May, 2007

JON W. DUDAS
*Director of the United States Patent and Trademark Office*